US009547668B2

(12) United States Patent
Beckmann et al.

(10) Patent No.: US 9,547,668 B2
(45) Date of Patent: Jan. 17, 2017

(54) EVENT-BASED CONTENT ITEM VIEW

(71) Applicant: Dropbox, Inc., San Francisco, CA (US)

(72) Inventors: Chris Beckmann, San Francisco, CA (US); Ramesh Balakrishnan, San Francisco, CA (US); Rajeev Nayak, San Francisco, CA (US); Yi Wei, San Francisco, CA (US); Ayush Sood, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 457 days.

(21) Appl. No.: 13/725,576

(22) Filed: Dec. 21, 2012

(65) Prior Publication Data

US 2014/0122994 A1     May 1, 2014

Related U.S. Application Data

(60) Provisional application No. 61/719,848, filed on Oct. 29, 2012.

(51) Int. Cl.
*G06F 17/00*     (2006.01)
*G06F 17/30*     (2006.01)

(52) U.S. Cl.
CPC ................. *G06F 17/30274* (2013.01)

(58) Field of Classification Search
CPC .............. G06F 17/2247; G06F 17/24
USPC .......................................... 715/234
See application file for complete search history.

(56) References Cited

U.S. PATENT DOCUMENTS

| | | | | |
|---|---|---|---|---|
| 5,493,728 A | * | 2/1996 | Solton et al. | 711/113 |
| 2007/0083818 A1 | * | 4/2007 | Drucker et al. | 715/767 |
| 2007/0186182 A1 | * | 8/2007 | Schiller | 715/781 |
| 2007/0214141 A1 | * | 9/2007 | Sittig et al. | 707/7 |
| 2007/0250791 A1 | * | 10/2007 | Halliday et al. | 715/808 |
| 2011/0202847 A1 | * | 8/2011 | Dimitrov | 715/738 |
| 2013/0239063 A1 | * | 9/2013 | Ubillos et al. | 715/838 |

* cited by examiner

*Primary Examiner* — Stephen Hong
*Assistant Examiner* — Marshon Robinson
(74) *Attorney, Agent, or Firm* — Polsinelli PC

(57) ABSTRACT

Systems, methods, and computer-readable storage media for an event-based photo view in a browser are disclosed. The system can receive a request to display a set of content items associated with a user account. The system can generate a web page based on a size of the set of files, the web page providing a continuous presentation of the set of files at the web page on a device, wherein a visible portion of the web page includes a presentation of files, and wherein the files are mapped to an area in the web page that is associated with a current position within the web page. The web page can include an events-based navigation feature. The system can transmit the web page to device for display at the device.

22 Claims, 9 Drawing Sheets

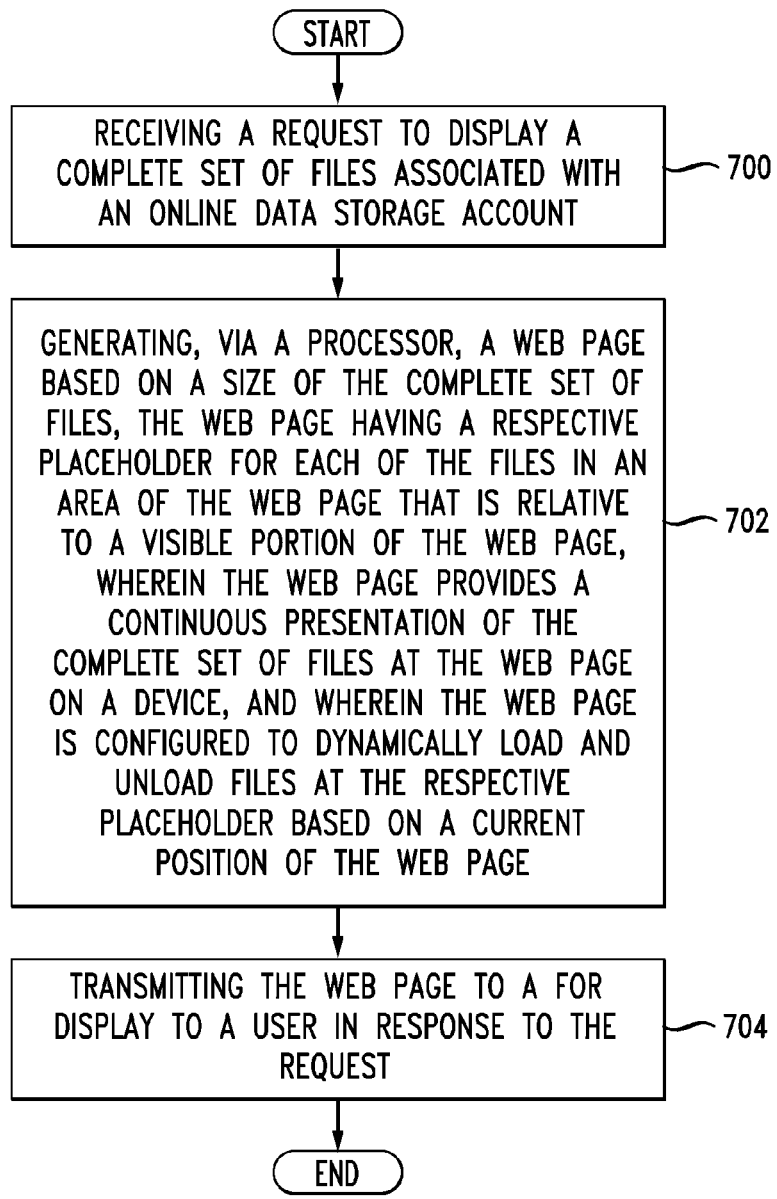

EVENT-BASED CONTENT ITEM VIEW

CROSS REFERENCE TO RELATED APPLICATIONS

This application claims the benefit of priority under 35 U.S.C. §119(e) of U.S. Provisional Patent Application No. 61/719,848, filed on Oct. 29, 2012, which is incorporated herein by reference in its entirety.

TECHNICAL FIELD

The present technology pertains to browsing content items stored in a network-based content management environment, and more specifically pertains to enhanced techniques for browsing collections of such content items.

BACKGROUND

Media recording capabilities, such as photography and video recording, have become common features available in a score of common, everyday devices. The ubiquity of such media recording capabilities has prompted a growing demand for media applications. In particular users are interested in applications to access media stored on different devices and to share media with other users. The Internet has further fueled the demand for media applications by greatly expanding the amount of media available to users and providing an ever-widening audience for conveniently sharing media.

Consequently, numerous browser-based tools and applications have emerged that allow users to share and access media from any Internet-connected device. For example, image search engines allow users to search the Web for image content and browse the searched photos through a web browser. Other browser-based tools and services, such as social networking sites, similarly allow users to view and share photos through a web browser. Similar functionality also exists in native client applications.

As users generate greater quantities of data, managing the data can become cumbersome, confusing, and difficult. Users often lose track of which files are where, and how to quickly find and display them.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following detailed description and accompanying drawings, or can be learned by the practice of the principles set forth herein.

The approaches set forth herein can be used to load and navigate through a large library of content items, such as photos, presented in a single page within an application, such as a web-browser or a native client application. Additionally, the large library of content items can be loaded in a manner that minimizes the amount of memory used by the application, thereby reducing the likelihood of causing the application to crash. A result of the disclosed approach is that a user does not have to spend time separately loading a number of different pages to browse the content items. Moreover, the user can have a continuous view of all the content items, which can help the user search and/or compare different content items without having to jump back and forth between various content item pages. These approaches can be used as part of an event-based navigation feature that allows a user to quickly navigate to a subset of content items associated with a particular event, without having to scroll through pages. The improved organization, presentation, and navigation of the content items can provide the user with a richer browsing experience.

Disclosed are systems, methods, and non-transitory computer-readable storage media for an event-based content item view in a content item browsing application. While the content item browsing application can be a native, compiled, or interpreted application or a browser-based application, the examples provided herein are described in terms of a browser-based application. In some embodiments, the system first receives a request to display a set of content items associated with a user account. In response, the system can generate a web page based on a size of the set of content items. The web page can provide a continuous presentation of the set of content items on a device. The content items can be mapped to an area in the web page that is associated with an event marker. The system can transmit the generated web page to a requesting device for display to a user.

In other embodiments, the system can receive a request to display a set of content items associated with a user account. In response, the system can generate a web page based on a size of the set of content items. The web page can be generated with placeholders for each of the content items. The content items can be dynamically loaded to and unloaded from the placeholders based on a currently visible position of the web page. The system can transmit the generated web page to a requesting device for display to a user.

The web page can be a single, continuous web page having a respective placeholder for each of the content items in an area of the web page that is relative to the currently visible portion of the web page on a display. The single, continuous web page can thus display, without pagination, more content items than can be stored at the memory available for use by the web page or the web browser. In this way, the single, continuous web page can provide an interface to display an entire library of content items on a browser that does not have enough memory to actually load the entire library of content items simultaneously, without causing the browser to crash.

The presentation of content items can include a listing of the content items from the set of content items, arranged by date, name, album, size, location, event, type, format, and so forth. For example, the content items can be arranged in chronological order or reverse chronological order. Moreover, the presentation of content items can also include an event-based navigation structure. The event-based navigation structure can be based on date ranges of content items, such as days, weeks, or months. The event-based navigation structure can alternatively be based on events such as Spring Break 2012, Halloween 1999, or August Camping trip.

In one embodiment, the event-based navigation structure can include a first display of dates along one display direction and a second display of the content items associated with each date along another direction. The dates can be associated with the content items in one or more ways. For example, the dates can be the dates the content items were created, the dates of events associated with the content items, the dates the content items were captured, the dates the content items were received, the dates the content items were edited, the dates the content items were added to a folder, etc. The presentation of content items can also include a first display of content item details along a plane and a second display of the content items along a parallel plane. The content item details can include dates associated with the content items, events associated with the content items, descriptions associated with the content items, names associated with the content items, locations associated with the content items, people associated with the content items, links associated with the content items, and so forth.

As used herein, the visible portion of the web page refers to the portion of the web page that is currently displayed on a display device. The portions of the web page outside of the visible portion are not visible in the sense that these portions are not currently displayed on a display. However, these portions of the web page can have loaded elements, including images, files, and/or elements having different visibility states and attributes, including visible and hidden attributes. Thus, the portions of the web page outside the visible portion, while not displayed under the current view, can have a visible state and/or attribute.

The visible portion of the web page can include a presentation a subset of content items from the set of content items. Each of the content items can be associated with placeholders in the web page. Additionally, different portions of the web page can be associated with different event markers. As a user navigates through the web page, the content items displayed in the visible portion can change. Additionally, a current view of the presentation of content items can fade out and a new view of the presentation of content items can fade in as a current position within the web page changes.

The web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the presentation of content items and/or a different view of the continuous presentation of the set of content items. The scroll bar can be operable to allow the user to scroll through the continuous presentation of the set of content items and/or web page. The different view of the presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window.

Moreover, the web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors. The factors can include the number of items in the set of content items, the size of the set (e.g. the number of bytes) the memory available for use by the browser, the size of individual content items, the scrolling speed, the type of browser, etc. When unloading content items, the web page can hide or remove the content items from the Document Object Model (DOM) of the browser, but can also keep placeholders for the unloaded content items or can keep images cached but not loaded.

Furthermore, the system can generate and transmit instructions for updating the web page based on changes made to the set of content items. For example, the system can add, edit, and/or delete one or more content items or folders from the set of content items and transmit instructions to the web browser for updating the web page to add or remove placeholders for any content items that were added or deleted from the set of content items.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 shows a second example method embodiment; and

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The present technology addresses the need in the art for improving the manner in which large collections of content items are presented in web browsers and client applications. A system, method and computer-readable media are disclosed which can provide an event-based navigation feature. A description of a system configuration in FIG. 1, which can be employed to practice the concepts, is disclosed herein. A more detailed description and variations of a continuous presentation of content items and smart loading and unloading will then follow. These variations shall be described herein as the various embodiments are set forth. The disclosure now turns to FIG. 1.

Figure 1:
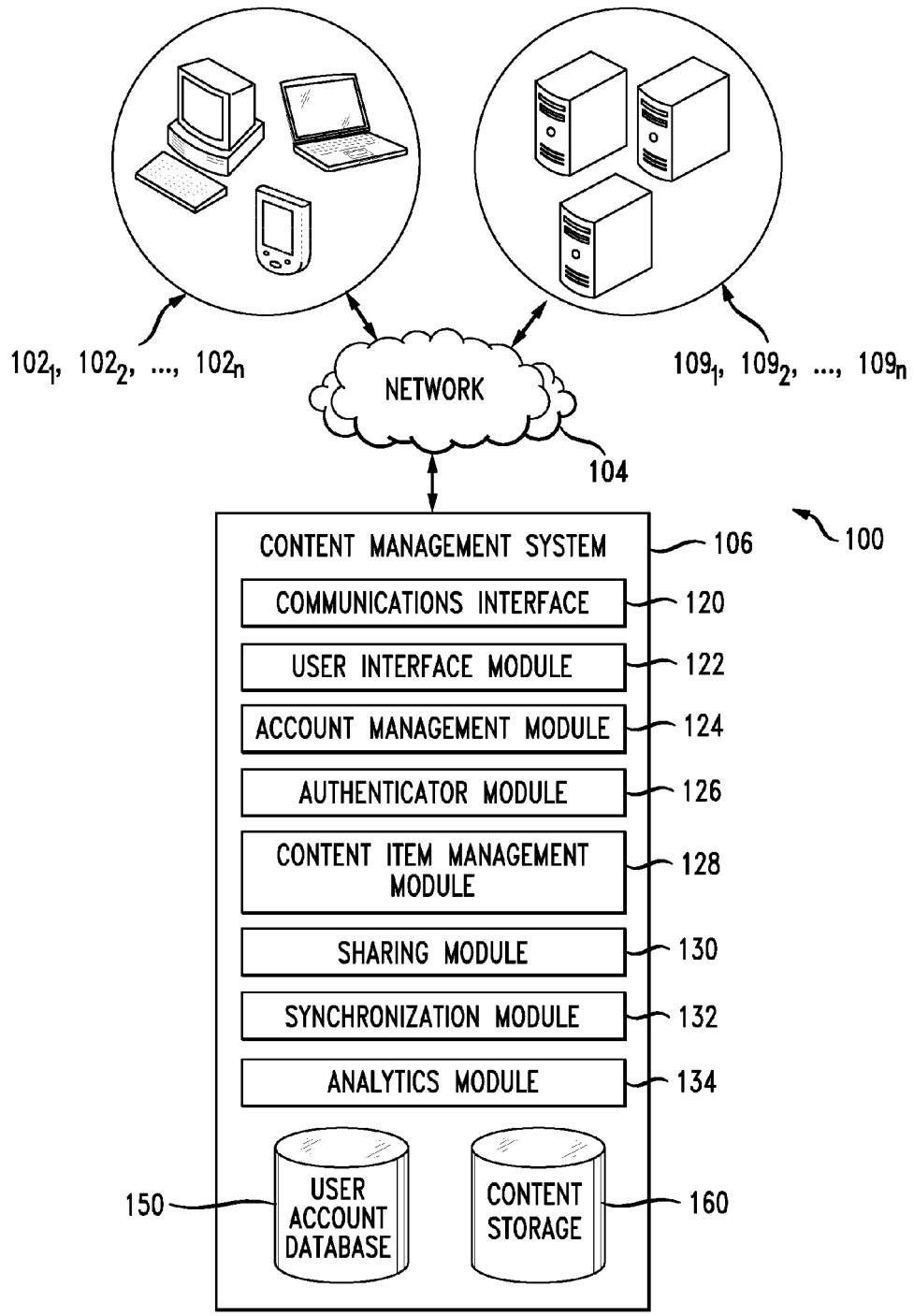
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the content item system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for content item changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate content item operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content item management module 128 for maintaining a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

The disclosure returns now to interfaces for browsing and more easily managing large quantities of content items, such as photos or videos, hosted by an online storage provider, locally stored content items, or content items from any other source. The interface provided herein can allow a user to navigate through a large collection of content items without having to scroll through them manually, thereby reducing tedious searching. Further, this approach can be enhanced to load content items in a way that makes efficient use of computing resources. A person skilled in the art will recognize that while the disclosure uses photos presented in a web browser as an example to illustrate the technology, a content item can be of any file type presented in any application designed to present content items without departing from the spirit and scope of the disclosure. For example the content items can be videos or documents. Furthermore, a library or collection of content items can include a mixture of file types, such as photos and videos.

Figure 2:
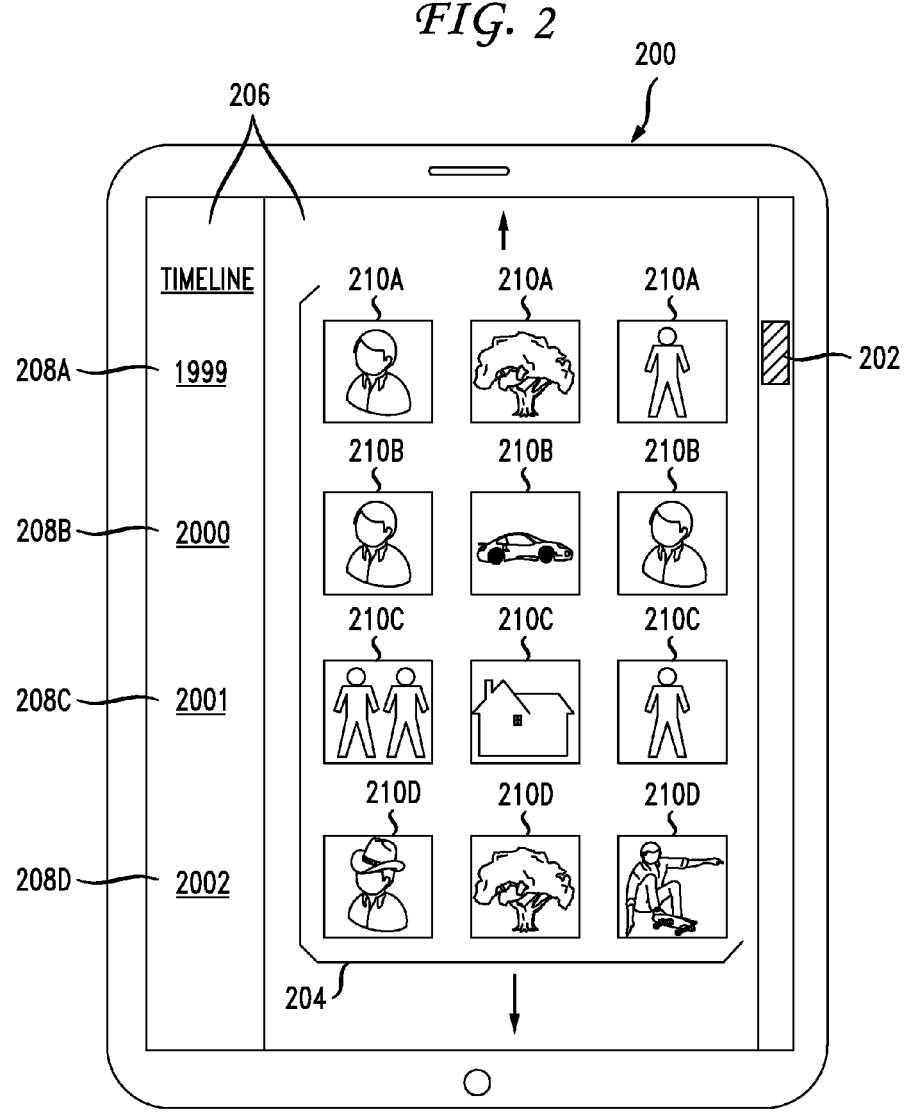
FIG. 2 shows an example web page for providing a continuous presentation of a set of images.

FIG. 2 shows an example web page for providing a continuous presentation of a set of images using an event-based navigation feature. Web page 200 can provide a continuous presentation of the set of images on a device. Some devices may be configured with less memory available for use by the web page than is required to display the set of images. Moreover, web page 200 can be based on the size (i.e. the number of events) of the set of images. For example, web page 200 can increase in size as the size of the image collection increases, and the layout and included elements in the event-based navigation feature can increase or change based on the size and makeup of the image collection. The way elements in web page 200 are displayed can also depend on the size and number of the images. The system can reserve a space on the page for each image in the collection, and account for each image in the collection when constructing the event-based navigation feature. The event-based navigation feature can account for each photo in the collection and each album or event in the collection, and provide an easy way for a user to quickly navigate to specific photos or events.

The displayed portion of web page 200 can include an event-based navigation feature to browse images 206 and a scroll bar 202 for scrolling through web page 200. Scroll bar 202 can be used to scroll through the continuous presentation of the images. Web page 200 can detect a scroll event and load images in areas of web page 200 located in the same area and/or direction of the scroll event. Web page 200 can also unload images in areas of web page 200 located away from the direction/area of the scroll event. For example, as scroll bar 202 moves towards one area of web page 200, web page 200 can load images in that area, including any portions around that area. Moreover, as scroll bar 202 moves towards one area of web page 200, web page 200 can also unload images that are away from that area of web page 200. The left pane of view 206 shows a fixed navigation bar of timeline labels, in the form of years 208A-208D. The left pane can be fixed in that the position of timeline labels can remain stationary, and in that the information displayed therein can provide an indication of the entire collection of images regardless of which photos are currently displayed. The user can click, tap, or otherwise select one of the labels in event-based navigation feature 206 to directly navigate to photos related to that label. For example a user can select a year and the system can navigate to photos associated with that year. The years are illustrative examples only, and can be replaced or augmented by more natural-language descriptions of photo contents or events depicted in the photos.

Event-based navigation feature 206 can include images 210A-D, which are mapped to an area 204 in web page 200 that is associated with the current position of scroll bar 202. The dates 208A-D are associated with images 210A-D in the area 204 of web page 200. Images 210A-D are arranged according to the list of dates 208A-D. For example, images 210A are associated with date 208A, and are thus grouped based on date 208A. Similarly, images 210B are associated with date 208B, and grouped based on date 208B. Likewise, images 210C and 210D are associated with dates 208C and 208D, respectively, and also grouped accordingly.

Images 210A-D can be arranged in ascending or descending chronological order, based on the order of dates 208A-D. Dates 208A-D can represent the dates images 210A-D were created, received, recorded, edited, added, etc. Dates 208A-D can also represent the date of an event associated with an image. Event-based navigation feature 206 can also include additional details associated with images 210A-D. For example, event-based navigation feature 206 can provide a title, name, event, location, and/or description for each of images 210A-D. For example, instead of, or in addition to, dates 208A-D, event-based navigation feature 206 can sort images 210A-D by album title and list the album title instead of, or in addition to, the dates 208A-D.

Figure 3:
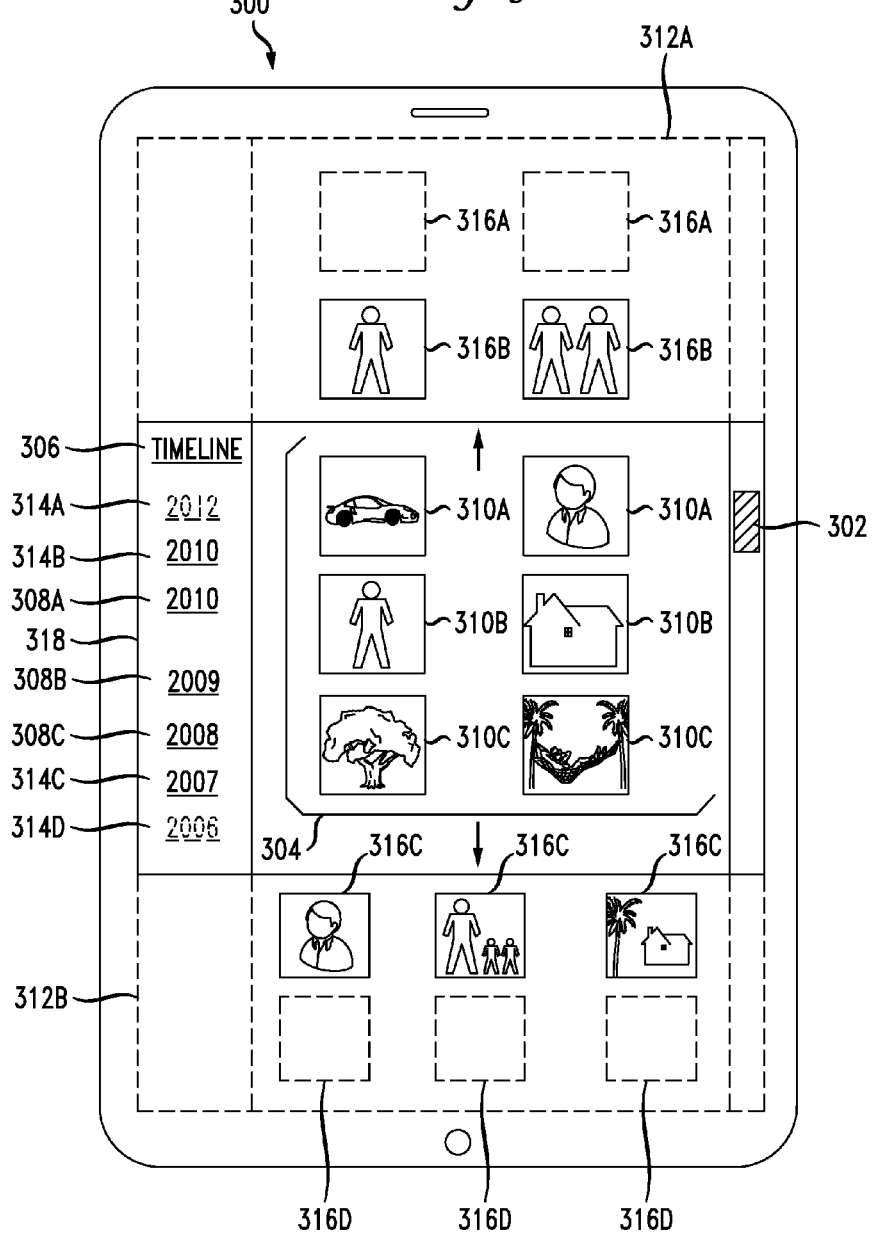
FIG. 3 shows an example of a continuous web page with smart loading and unloading.

FIG. 3 shows an example of a continuous web page with smart loading and unloading. Web page 300 can provide a continuous presentation of a set of content items such as images on a device having a memory available for use by the web page that is less than a size of the set of images. Web page 300 can include scroll bar 302 for scrolling through web page 300. Moreover, web page 300 can include in-view portion 318 and two off-view portions 312A-B. In-view portion 318 can be a portion of web page 300 that is currently displayed on the web browser. On the other hand, off-view portions 312A-B can be portions of web page 300 that are not currently displayed on the web browser. Thus, off-view portions 312A-B are portions of web page 300 that are not in view. However, web page 300 can be scrolled up or down to place any of off-view portions 312A-B in view. Off-view portions 312A-B are displayed on the web browser when they are placed in view. For example, web page 300 can be scrolled up to place off-view portion 312A, or a part of off-view portion 312A, in view. As a result, any part of off-view portion 312A that is placed in view will be displayed on the web browser. This may also result in in-view portion 318, or a part of in-view portion 318, becoming off view. Any part of in-view portion 318 that becomes off view will not be displayed on the web browser at that specific scroll location of web page 300.

In-view portion 318 of web page 300 can include event-based navigation bar 306 that provides a navigation structure for all the photos in the collection, regardless of whether the photos are in view or not. Event-based navigation bar 306 can include dates 308A-C and 314A, 314B, 314C, 314D, and image area 304, which can display images 310A-C. Dates 308A-C in in-view portion 318 of web page 300 can be associated with images 310A-C in image area 304. Off-view portions 312A-B of the web page 300 can include images 316A-D, which are not displayed in in-view portion 318 of web page 300, although dates 314A-D, which are associated with images 316A-D, can be displayed as part of the event-based navigation structure regardless of whether images 316A-D are visible. Images 316B-C and dates 314B-C, which are adjacent to in-view portion 318 of web page 300, can be loaded and ready to be displayed if web page 300 is scrolled and images 316B-C and dates 314B-C are placed in view. Placeholders 316A and 316D do not have images loaded because they are not in view and are farther away from in-view portion 318, but the images can be loaded as web page 300 is scrolled and/or placeholders 316A and 316D are placed in view. For example, as web page 300 is scrolled up towards placeholder 316A, and placeholder 316A is placed in view, web page 300 can load an image for display at placeholder 316A.

Event-based navigation feature 306 can remain constant along one side of the page, and can be user-configurable to appear in any location on the page. The user can use the event-based navigation feature to directly jump to a particular point in the collection. For example, the user can click on 2006 (314D) in the event-based navigation structure to jump instantly to photos from 2006 (316D). The layout of the event-based navigation structure 306 can be based on the full collection of photos, so that the spacing between the labels in the event-based navigation represents the relative number of photos present in a particular section. For example, larger spaces between 2010 and 2009 can indicate more items in that part of the collection than between 2008 and 2007.

In some embodiments, off-view portions 312A-B may not have any images loaded. Instead, off-view portions 312A-B can have placeholders for images to be loaded when off-view portions 312A-B are placed in view. In this case, images 316B and images 316C would only be loaded when they are placed in view and/or when web page 300 is scrolled in their direction. In other embodiments, web page 300 can have more or less images loaded in off-view portions 312A-B depending on various factors. The factors can include the total size of the images, the size of individual images, the number of images, the scrolling speed, the browser memory, the user preferences, the browser type, etc. For example, if web page 300 contains a large number of images, it can load more images in off-view portions 312A-B to allow the user to quickly scroll through a large number of images in web page 300. As another example, if the size of the images is large, the web page 300 can reduce the number of images loaded in off-view portions 312A-B, to reduce the amount of memory required by web page 300.

In one variation, the system can generate the web page, including JavaScript or other script instructions that provide certain portions of the client-side functionality. The script instructions can detect a browser type and other system parameters, such as an amount of memory available to the browser or available to a thread associated with displaying web page 300 in a tab in the browser. The script can govern how many images are loaded and when images are unloaded based on the memory available to the browser. Thus, different browsers on a same computer or the same browser on different computers may lead to different quantities of images that the script instructions allow the browser to load simultaneously. Thus, as browser technology or available memory improve, the scripting instructions can automatically adapt to allow additional images to be loaded at the same time when displaying the web page.

Figure 4:
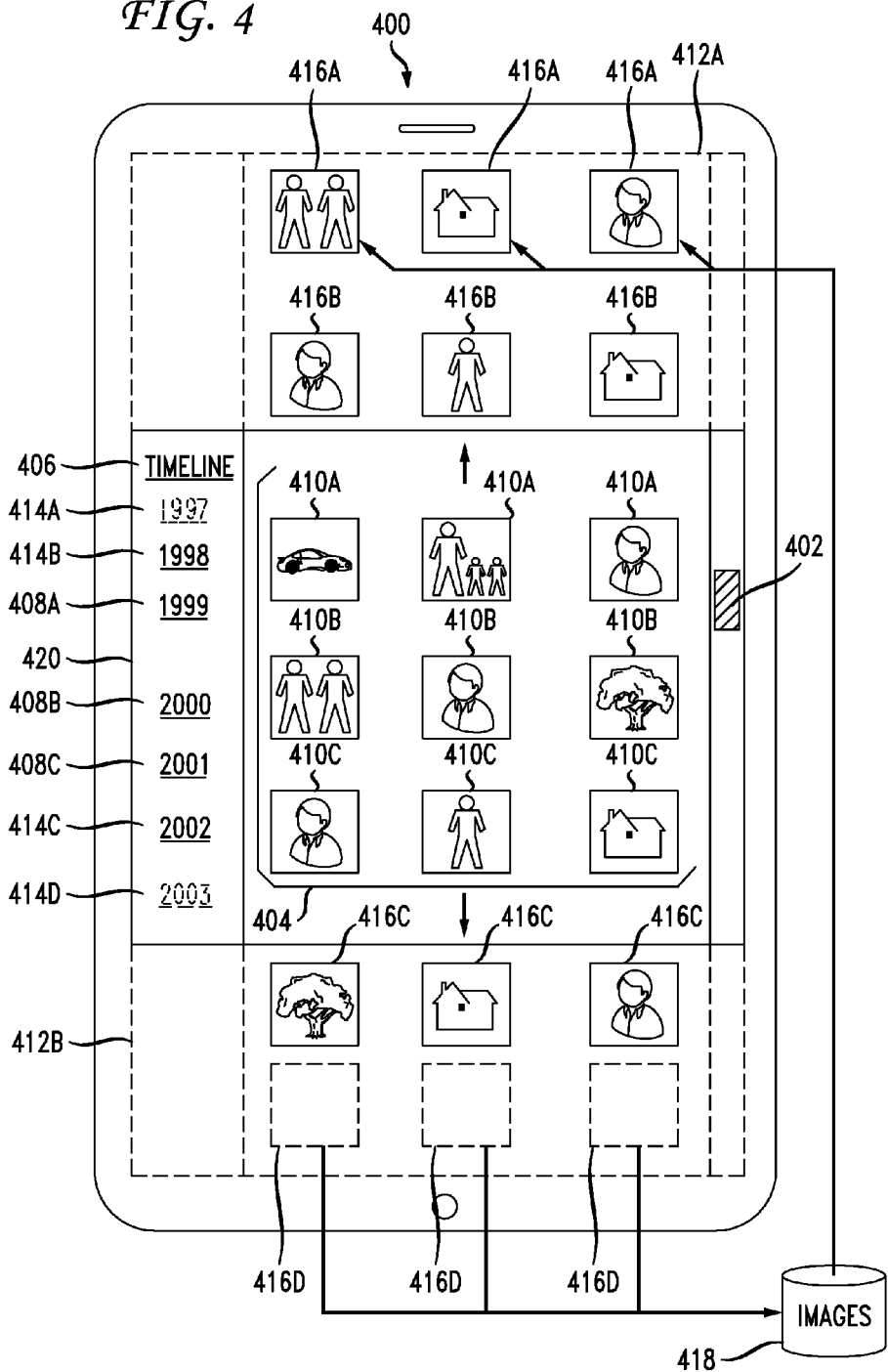
FIG. 4 shows an example of smart loading and unloading images in a continuous web page.

FIG. 4 shows another example of smart loading and unloading images in a continuous web page. Web page 400 can provide a continuous presentation of a set of images on a device having a memory available for use by the web page that is less than a size of the set of images. The smart loading and unloading can make it possible for web page 400 to present all of the images in a single, continuous page, without crashing the browser even if the images require more memory than is available for use by the browser.

Web page 400 can include a scroll bar 402 for scrolling through content in web page 400. Moreover, web page 400 can include in-view portion 420 and two off-view portions 412A-B. In some embodiments, web page 400 can include additional in-view and/or off-view portions. In-view portion 420 of web page 400 can include event-based navigation feature 406 with dates 408A-C and image area 404, which displays images 410A-C. Dates 408A-C in in-view portion 420 of web page 400 are associated with images 410A-C in image area 404. Image area 404 can correspond to an area of in-view portion 420 that is currently displaying images 410A-C. Off-view portions 412A-B of web page can include images 416A-D, which are not displayed in in-view portion 420 of web page 400, and dates 414A-D, which are associated with images 416A-D.

Images 416B-C and dates 414B-C, which are adjacent to in-view portion 420 of web page 400, can be loaded and ready to be displayed if web page 400 is scrolled and images 416B-C and dates 414B-C are placed in view. Placeholders 416A and 416D do not have images loaded because they are not in view and are farther away from in-view portion 418, but can be loaded as web page 400 is scrolled and/or placeholders 416A and 416D are placed in view. The images can be loaded in placeholders 416A and 416D from image database 418.

In FIG. 4, scroll bar 402 is moving up, causing web page 400 to scroll up towards off-view portion 412A. As web page 400 scrolls up, images 416A can be loaded at their respective placeholders, and images 416D can be unloaded. Images 416A can be loaded because the scrolling may place off-view portion 412A, where the placeholders for images 416A are located, in view. On the other hand, images 416D can be unloaded because web page 400 is scrolling away from images 416D. Images 416A can be loaded from image database 418, and images 416D can be unloaded to the image database 418.

By dynamically loading and unloading images, web page 400 can present a continuous presentation of a set of images on a device having a memory available for use by the web page that is less than a size of the set of images. Here, web page 400 can present all of the images on the device, in a single, continuous web page, without pagination and without causing the web browser to crash. Web page 400 can load images as they are needed for display, and unload other images that are not in display, in order to limit the use of browser memory. Web page 400 can reserve space for all of the images via placeholders, and load images from image database 418 at particular placeholders on web page 400, as web page 400 scrolls towards those placeholders. Web page 400 can then hide or unload images from web page 400 as web page 400 scrolls away from the images. When unloading images, web page 400 can keep the placeholders for those images on web page 400.

Figure 5:
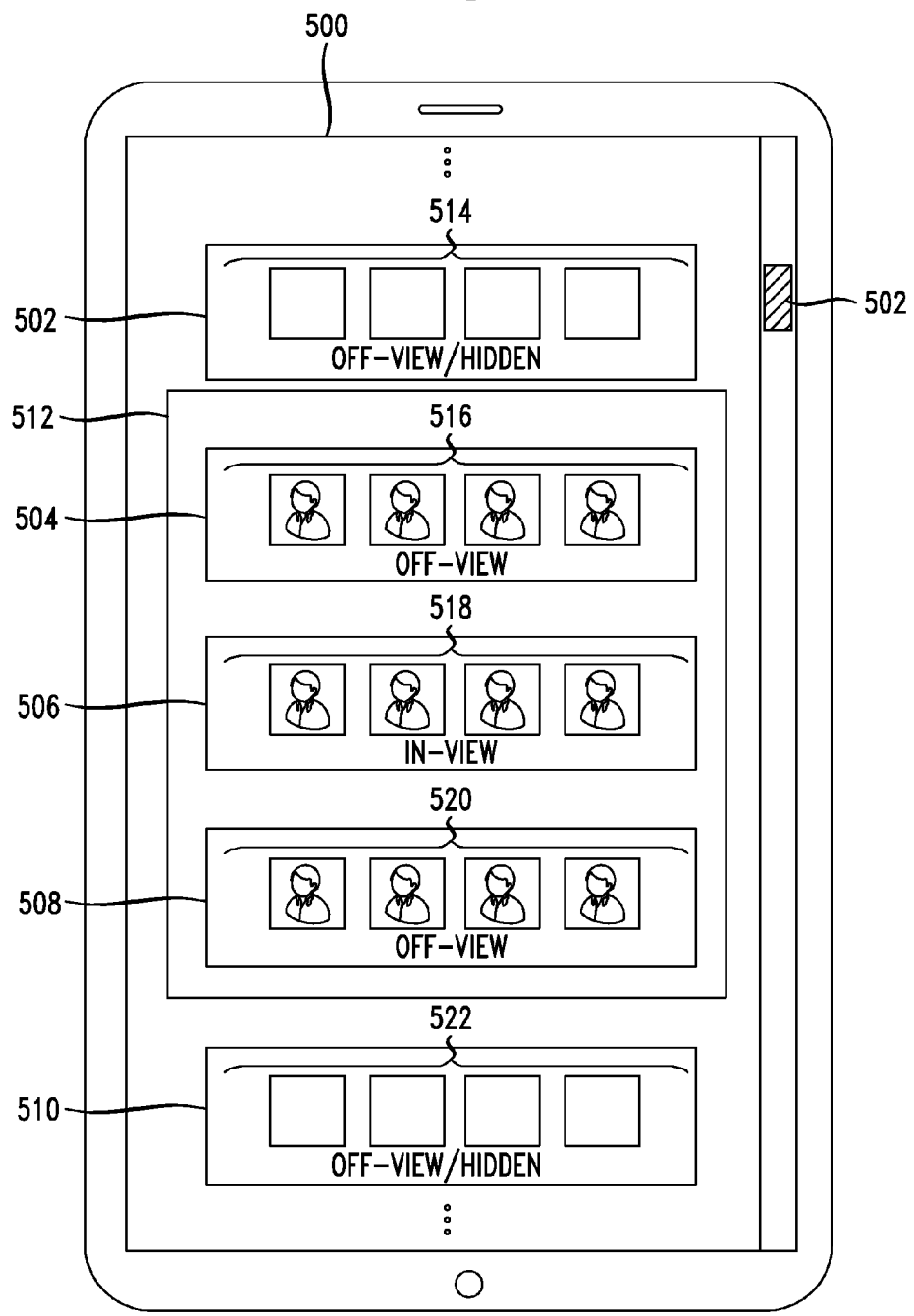
FIG. 5 shows an example structure of a web page with smart loading and unloading.

FIG. 5 shows another example structure of a web page with smart loading and unloading. The structure of web page 500 makes it possible for web page 500 to provide a continuous presentation of a library of images within a single, continuous web page, using smart loading and unloading. Web page 500 can include in-view portion 506 and off-view portions 502, 504, 508, 510. In-view means the portion is currently displayed, and off-view means the portion is not displayed (e.g., is not in the displayed view/area). Whether a portion of web page 500 is in view or off view can depend on whether the portion of web page 500 is inside or outside the boundaries of the display in the current view. If the user moves or scrolls to a different portion of web page 500, then the portion that was in view before the user moved or scrolled to the different portion will become off view, and an off view portion that is now within the boundaries of the display will become in view. Thus, when the user moves or scrolls to a different area of web page 500, in-view portion 506 can move outside of the displayed view and one or more of off-view portions 502 can move within the displayed view.

Loaded portion 512 of web page 500 can include those portions of web page 500 that have images already loaded. Specifically, loaded portion 512 can include off-view portions 504 and 508 and in-view portion 506. In-view portion 506 has images 518 loaded and displayed under the current view. On the other hand, off-view portions 504 and 508 have the images 516 and 520 loaded, but are not displayed under the current view, as they are currently outside the boundaries of the display.

Off-view portions 514 and 510 are not in the loaded portion 512 of web page 500 because they do not have images loaded. Instead, off-view portions 514 and 510 have placeholders for images that will be loaded if off-view portions 514 and 510 are moved within loaded portion 512 of web page 500. For example, if the user moves or scrolls up one level in web page 500, loaded portion 512 will change to include off-view portions 502 and 504 and in-view portion 506. In this case, web page 500 will load images at the placeholders 514 in off-view portion 502, and will unload images 520 from off-view portion 508. Moreover, off-view portion 504 will be placed in view, and in-view portion 506 will be placed off view. Thus, web page 500 will display the images 516 in portion 504, but will have images 514 and 518 loaded at portions 502 and 508, respectively.

Figure 6:
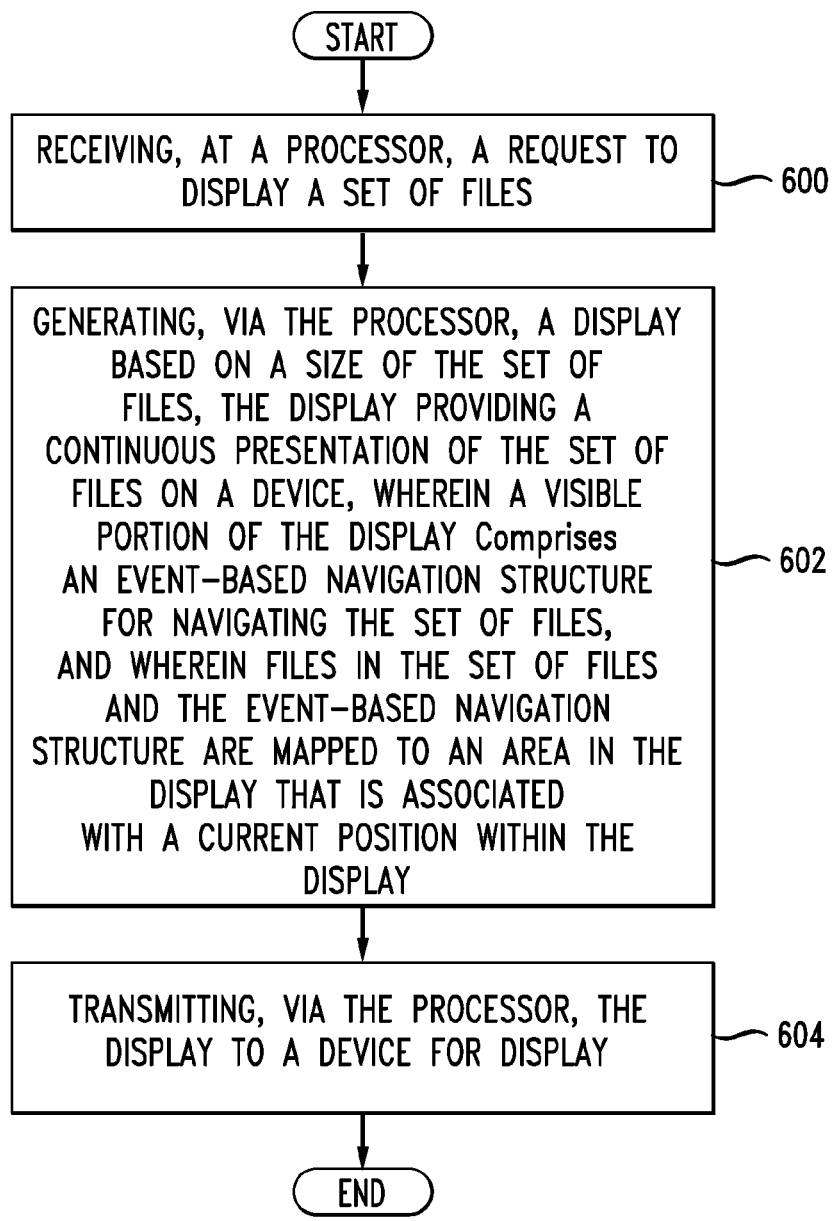
FIG. 6 shows a first example method embodiment.

Having disclosed some basic system components and concepts, the disclosure now turns to the example method embodiments shown in FIGS. 6 and 7. For the sake of clarity, the methods are described in terms of an example system 100, as shown in FIG. 1. The steps outlined herein are illustrative and can be implemented in any combination thereof, including combinations that exclude, add, or modify certain steps.

FIG. 6 shows a first method embodiment for an event-based navigation interface. The content management system 106 can receive a request to display a set of content items associated with a user account (600). In response, the content management system 106 can generate a web page based on a size of the set of content items, the web page providing a continuous presentation of the set of content items on a device, wherein a visible portion of the web page can include a presentation of content items from the set of content items, and wherein content items in the presentation of content items can be mapped to an area in the web page that is associated with a current position within the web page (602). In response to the request, the content management system 106 can transmit the web page to a requesting client device $102_i$ for display to a user (604).

The web page can be a single, continuous web page having a respective placeholder for each of the content items in an area of the web page that is relative to the visible portion of the web page. The single, continuous web page can display, without pagination, more content items than can be stored at the memory available for use by the web page. Thus, the single, continuous web page can display an entire library of content items on a browser that does not have enough memory to load the entire library of content items, without causing the browser to crash.

The content items can include an image, a document, a video, and/or a combination thereof. The presentation of content items can include a listing of the content items from the set of content items arranged by date, name, album, size, location, event, type, format, and so forth. For example, the content items can be arranged in chronological order or reverse chronological order, such as in a timeline. Moreover, the presentation of content items can also include a first display of dates along a plane and a second display of the content items along a parallel plane. Here, the dates can be associated with the content items. For example, the dates can be the dates the images were created, the dates of events associated with the images, the dates the images were captured, the dates the images were received, etc. The presentation of content items can also include an event-based presentation of content items. The event-based presentation of content items can include a first display of content item details along a plane and a second display of the content items along a parallel plane. The content item details can include dates associated with the content items, events associated with the content items, descriptions associated with the content items, names associated with the content items, locations associated with the content items, people associated with the content items, and so forth.

The visible portion of the web page can refer to the portion of the web page that is currently being displayed. The portions of the web page outside of the visible portion are not visible in the sense that these portions are not currently displayed. However, these portions of the web page can have loaded elements, including images, and/or elements having different visibility states and attributes, including visible and hidden attributes. Thus, the portions of the web page outside the visible portion, while not displayed under the current view, can have a visible state and/or attribute.

Moreover, the visible portion of the web page can include a different view of the presentation of content items when the current position within the web page changes. For example, the visible portion of the web page can present different content items as a user navigates and/or scrolls through the web page. Further, a current view of the presentation of content items can fade out and the different view of the presentation of content items can fade in as the current position within the web page changes.

Also, the web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the presentation of content items and/or a different view of the continuous presentation of the set of content items. The scroll bar can be operable to allow the user to scroll through the continuous presentation of the set of content items and/or web page. The user can move through the web page by using the scroll bar to scroll, swiping a finger or pointing device on the screen, and/or clicking on a link/anchor pointing to a different portion of the web page.

The different view of the presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window. The different view can also be associated with the position of the web page relative to the display and/or web browser.

The web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors, including the size of the set of content items, the memory available for use by the browser, the size of individual content items, the scrolling speed, the total number of content items, the type of browser, etc. When unloading content items, the web page can hide or remove the content items from the Document Object Model (DOM) of the browser, but can also keep placeholders for the unloaded content items.

Furthermore, the content management system 106 can generate and transmit instructions for updating the web page based on changes made to the set of content items. For example, the content management system 106 can add, edit, and/or delete one or more content items or folders from the set of content items and transmit instructions to the web browser for updating the web page to add or remove placeholders for any content items that were added or deleted from the set of content items.

FIG. 7 shows a second example method embodiment for an event-based navigation of content items. Here, the content management system 106 can receive a request to display a set of content items associated with a user account (700). In response, the content management system 106 can generate a web page based on a size of the set of content items, the web page having a respective placeholder for each of the content items in an area of the web page that is relative to a visible portion of the web page, wherein the web page provides a continuous presentation of the set of content items at the web page on a device, and wherein the web page is configured to dynamically load and unload content items at the respective placeholder based on a current position of the web page (702). The content management system 106 can transmit the web page to a device for display to a user (704).

The web page can be a single, continuous web page having a respective placeholder for each of the content items in an area of the web page that is relative to the visible portion of the web page. The single, continuous web page can display, without pagination, more content items than can be stored at the memory available for use by the web page. Thus, the single, continuous web page can display an entire library of content items on a browser that does not have enough memory to load the entire library of content items, without causing the browser to crash.

The continuous presentation of the set of content items can include a listing of the content items from the set of content items arranged by date, name, album, size, location, event, type, format, and so forth. For example, the content items can be arranged in chronological order or reverse chronological order. Moreover, the continuous presentation of the set of content items can also include a first display of dates along a plane and a second display of the content items along a parallel plane. Here, the dates can be associated with the content items. For example, the dates can be the dates the content items were created, the dates of events associated with the content items, the dates the content items were captured, the dates the content items were received, etc. The continuous presentation of the set of content items can also include a first display of content item details along a plane and a second display of the content items along a parallel plane. The content item details can include dates associated with the content items, events associated with the content items, descriptions associated with the content items, names associated with the content items, locations associated with the content items, people associated with the content items, and so forth.

The visible portion of the web page can refer to the portion of the web page that is currently being displayed. The portions of the web page outside of the visible portion are not visible in the sense that these portions are not currently displayed. However, these portions of the web page can have loaded elements, including images, and/or elements having different visibility states and attributes, including visible and hidden attributes. Thus, the portions of the web page outside the visible portion, while not displayed under the current view, can have a visible state and/or attribute.

The visible portion of the web page can include an event-based presentation of content items from the set of content items, where content items in the event-based presentation of content items can have placeholders in a portion of the web page that is associated with a current position within the web page. Moreover, the visible portion of the web page can include a different view of the event-based presentation of content items when the current position within the web page changes. For example, the visible portion of the web page can present different content items as a user navigates and/or scrolls through the web page. Further, a current view of the event-based presentation of content items can fade out and the different view of the event-based presentation of content items can fade in as the current position within the web page changes.

Also, the web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the event-based presentation of content items and/or a different view of the continuous presentation of the set of content items. The scroll bar can be operable to allow the user to scroll through the continuous presentation of the set of content items and/or web page. The different view of the event-based presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window.

Moreover, the web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors, including the size of the set of content items, the memory available for use by the browser, the size of individual content items, the scrolling speed, the total number of content items, the type of browser, etc. When unloading content items, the web page can hide or remove the content items from the Document Object Model (DOM) of the browser, but can also keep placeholders for the unloaded content items.

Furthermore, the content management system 106 can generate and transmit instructions for updating the web page based on changes made to the set of content items. For example, the content management system 106 can add, edit, and/or delete one or more content items or folders from the set of content items and transmit instructions to the web browser for updating the web page to add or remove placeholders for any content items that were added or deleted from the set of content items.

Figure 8A:
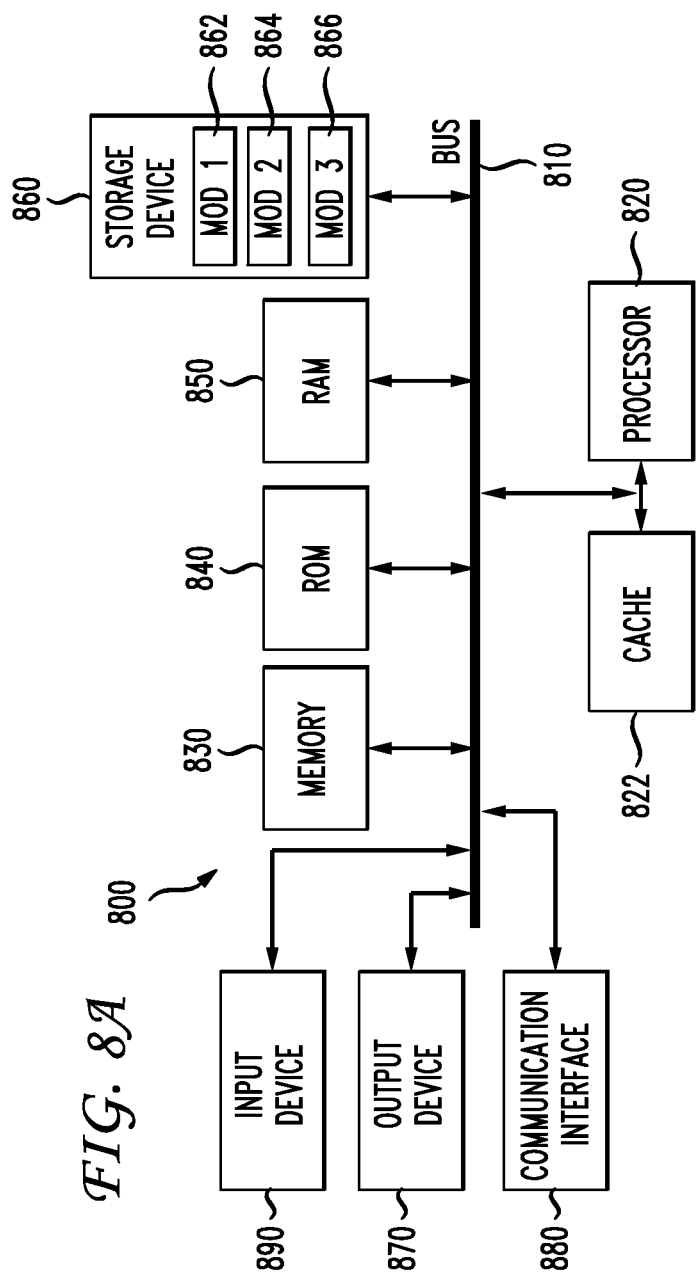
FIGS. 8A and 8B show exemplary possible system embodiments.
Figure 8B:
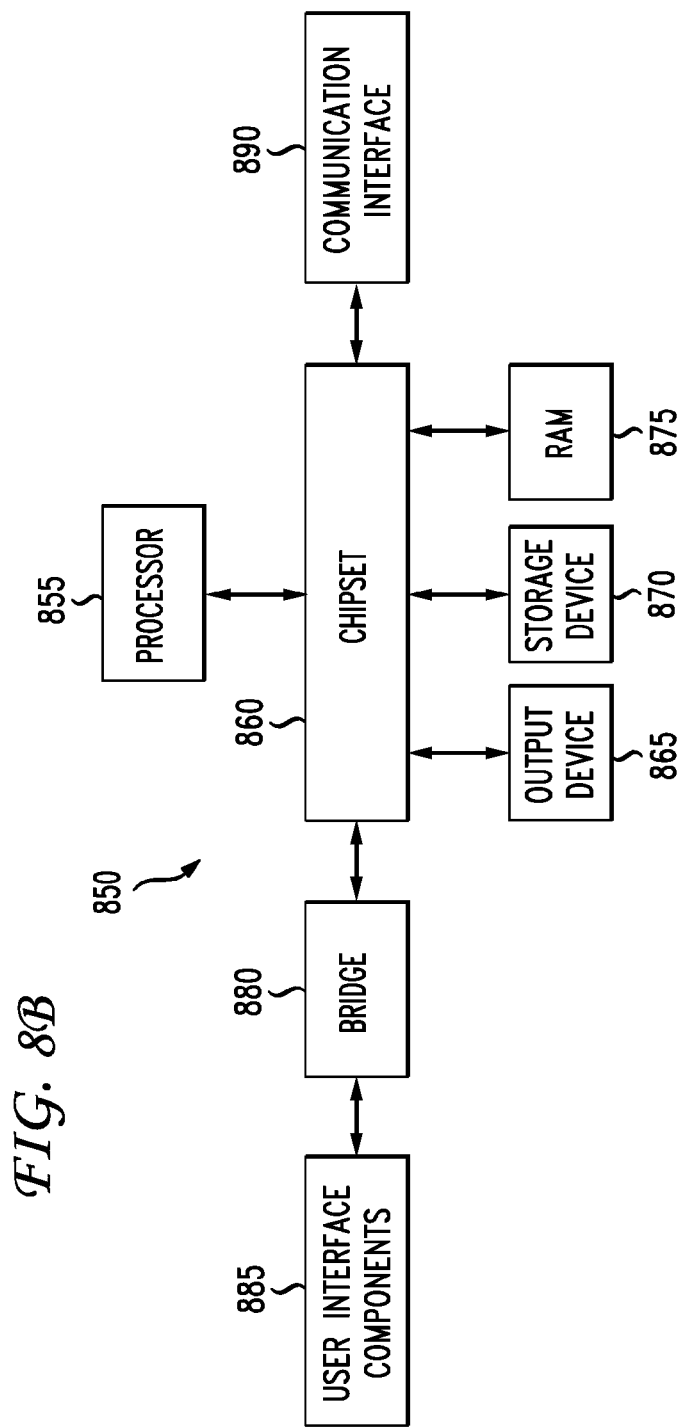

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, at a processor, a request to display a plurality of sets of stored content items, wherein each set is associated with a predefined event;
generating, via the processor, a page based on the number of sets of content items and the number of content items within each set, the page providing a continuous presentation of the sets of content items on a device, wherein a visible portion of the page comprises an event-based navigation structure for navigating the sets of content items, wherein spacing between labels in the event-based navigation structure corresponds to a relative number of content items present in the set of content items, and wherein content items in each set are mapped to an area in the page that is associated with a current event in the navigation structure, with the event-based navigation structure comprising a listing of the content items from the sets of content items in a chronological order and by album;
presenting, via the processor, the page of the sets of content items to the device for viewing on a display of the device;
in response to an album being selected, generating, via the processor, a page based on the number of content items within the selected album, the page providing a continuous presentation of the content items within the album on the device; and
presenting, via the processor, the page of the content items within the album to the device for viewing on the display of the device.

2. The method of claim 1, wherein listing of the content items from the sets of content items arranged in one of forward chronological order and reverse chronological order.

3. The method of claim 1, wherein the visible portion of the page comprises a different view of the event-based navigation structure when the current position of the page within the display changes.

4. The method of claim 3, wherein a current view of the event-based navigation structure fades out and the different view of the event-based navigation structure fades in as the current position of the page within the display changes.

5. The method of claim 1, wherein the page comprises a single, continuous page having a respective placeholder for each of the content items in an area of the page that is relative to the visible portion of the display.

6. The method of claim 5, wherein the single, continuous page contains, without pagination, more content items than can be stored at the memory available for use by the display.

7. The method of claim 1, wherein the event-based navigation structure comprises a first list of dates along a plane and a second list of the content items along a parallel plane, wherein the dates are associated with the content items.

8. The method of claim 1, wherein the event-based navigation structure comprises a first list of content item details along a first direction and a second list of the content items associated with the content item details along another direction, wherein the content item details comprise at least one from a group comprising of dates associated with the content items, events associated with the content items, descriptions associated with the content items, names associated with the content items, locations associated with the content items, and people associated with the content items.

9. The method of claim 1, wherein the display is configured to detect a scroll event comprising a movement of a scroll bar in a web browser window associated with the display and dynamically update the visible portion of the page based on the different view of the event-based navigation structure.

10. The method of claim 9, wherein the scroll bar is operable to allow the user to scroll through the continuous presentation of the sets of content items.

11. The method of claim 1, further comprising:
editing one of the sets of content items to yield updated sets of content items; and
sending instructions to a web browser for updating the page to include placeholders for the updated sets of content items.

12. The method of claim 1, wherein the content items are stored in a multi-user network-based content management system, whereby the content items may be shared by multiple users and across different client devices.

13. A system comprising:
a processor; and
a non-transitory computer-readable storage medium having stored therein processor-executable instructions for causing the processor to:
receive a request to display a plurality of sets of content items associated with an online data storage account, each set being associated with a predefined event;
generate a web page based on the number of sets of content items and the number of content items within each set, wherein the web page provides a continuous presentation of the sets of content items on a device, wherein a visible portion of the web page comprises a presentation of content items from the sets of content items and an event-based navigation structure for navigating the sets of content items wherein spacing between labels in the event-based navigation structure corresponds to a relative number of content items present in the set of content items, and wherein content items in each set are mapped to an area in the page that is associated with an event in the navigation structure position within the web page, with the event-based navigation structure comprising a listing of the content items from the sets of content items in a chronological order and by album;
present the web page of the sets of content items to the device for viewing on a display of the device;
in response to an album being selected, generate a web page based on the number of content items within the selected album, the page providing a continuous presentation of the content items within the album on the device; and
present the web page of the content items within the album to the device for viewing on the display of the device.

14. The system of claim 13, wherein the listing of the content items from the sets of content items arranged in one of forward chronological order and reverse chronological order.

15. The system of claim 13, wherein the visible portion of the web page comprises a different view of the presentation of content items when the current position within the web page changes.

16. The system of claim 15, wherein a current view of the presentation of content items fades out and the different view of the presentation of content items fades in as the current position within the web page changes.

17. The system of claim 13, wherein the web page comprises a single, continuous web page having a respective placeholder for each of the content items in an area of the web page that is relative to the visible portion of the web page, and wherein the single, continuous web page displays, without pagination, more content items than can be stored at a memory available for use by the web page.

18. A non-transitory computer-readable storage medium having stored therein instructions for causing a processor to:
receive a request to display a plurality of sets of content items associated with an online data storage account, each set being associated with a predefined event;
generate a web page based on the number of sets of content items and the number of content items within each set, wherein the web page provides a continuous presentation of the sets of content items on a device having a memory available for use by the web page that is less than a size of the sets of content items, wherein a visible portion of the web page comprises a timeline of events corresponding to different sets of content items with the different sets of content items arranged in a chronological order and by album, wherein content items associated with each event in the timeline are mapped to an area in the web page that is associated with a corresponding event within the web page and wherein spacing between labels in the timeline of events corresponds to a relative number of content items present in the set of content items;
send the web page of the sets of content items to a device for viewing on a display at the device;
in response to an album being selected, generate a web page based on the number of content items within the selected album, the web page providing a continuous presentation of the content items within the album on the device; and
presenting the web page of the content items within the album to the device for viewing on the display of the device.

19. The non-transitory computer-readable storage medium of claim 18, wherein the web page is configured to detect a scroll event comprising a movement of a scroll bar in a web browser window associated with the web page and dynamically update the visible portion of the web page based on the different view of the timeline of content items.

20. The non-transitory computer-readable storage medium of claim 18, wherein the visible portion of the web page comprises a different view of the timeline of content items when the current position within the web page changes, and wherein a current view of the timeline of content items fades out and the different view of the timeline of content items fades in as the current position within the web page changes.

21. The non-transitory computer-readable storage medium of claim 18, wherein the web page comprises a single, continuous web page having a respective placeholder for each of the sets of content items in an area of the web page that is relative to the visible portion of the web page, and wherein the single, continuous web page displays, without pagination, more content items than can be stored at the memory available for use by the web page.

22. The system of claim 13, wherein the content items are stored in a multi-user network-based content management system, whereby the content items may be shared by multiple users and across different client devices.

* * * * *